United States Patent
Baranowski et al.

(10) Patent No.: US 12,283,857 B2
(45) Date of Patent: Apr. 22, 2025

(54) PRODUCTION METHOD FOR A HAIRPIN COIL

(71) Applicant: Ford Global Technologies, LLC, Dearborn, MI (US)

(72) Inventors: Thomas Baranowski, Würselen (DE); Maik Broda, Würselen (DE); Raphael Koch, Odenthal (DE); Marcel Mathissen, Übach-Palenberg (DE); Maira Magnani, Aachen (DE); Julius Maximilian Engelke, Aachen (DE); Ferat Oezkan, Übach-Palenberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 17/406,803

(22) Filed: Aug. 19, 2021

(65) Prior Publication Data
US 2022/0060075 A1    Feb. 24, 2022

(30) Foreign Application Priority Data

Aug. 20, 2020   (DE) .......................... 102020210575.8

(51) Int. Cl.
*H02K 15/00*    (2006.01)
*H02K 3/28*    (2006.01)
*H02K 3/48*    (2006.01)

(52) U.S. Cl.
CPC .................. *H02K 3/28* (2013.01); *H02K 3/48* (2013.01); *H02K 15/0068* (2013.01)

(58) Field of Classification Search
CPC .................. H02K 15/0087; H02K 15/0068
See application file for complete search history.

(56) References Cited

U.S. PATENT DOCUMENTS

| | | | | |
|---|---|---|---|---|
| 8,443,509 | B1* | 5/2013 | De Souza | H02K 15/0081 29/598 |
| 2004/0113508 | A1* | 6/2004 | Yasuhara | H02K 15/0012 310/211 |
| 2016/0352200 | A1* | 12/2016 | Kaneda | H02K 15/0012 |

(Continued)

FOREIGN PATENT DOCUMENTS

| | | |
|---|---|---|
| CN | 110417151 | 11/2019 |
| DE | 10258029 | 1/2010 |

(Continued)

OTHER PUBLICATIONS

Examination Report issued in corresponding DE Application 102020210575.8, issued Sep. 22, 2021.

*Primary Examiner* — Livius R. Cazan
(74) *Attorney, Agent, or Firm* — Burris Law, PLLC (57) ABSTRACT

A production method for manufacturing a hairpin coil includes positioning a plurality of hairpin-like conductor elements on a coil support such that conductor end portions of conductor elements to be connected, which protrude from the coil support, are arranged adjacent to one another as conductor end portion pairs, securing the relative position of the conductor end portions of a conductor end portion pair, and simultaneously welding the respective conductor end portions of a plurality of conductor end portion pairs by friction welding, by a friction surface of a welding tool being simultaneously moved in a frictional manner along the plurality of conductor end portion pairs.

19 Claims, 4 Drawing Sheets

(56) References Cited

U.S. PATENT DOCUMENTS

2017/0033629 A1     2/2017   Haldemann et al.
2020/0044507 A1*   2/2020   Tang .................. H02K 3/524
2020/0153319 A1*   5/2020   Reiser ............ H02K 15/0087

FOREIGN PATENT DOCUMENTS

| DE | 102014208887 | | 11/2015 |
| --- | --- | --- | --- |
| DE | 102016119841 | | 4/2018 |
| DE | 102018103100 | | 1/2019 |
| DE | 102019201037 | | 1/2020 |
| JP | 06153469 A | * | 5/1994 |
| JP | H06153469 | | 5/1994 |
| JP | 2004236456 | | 8/2004 |

* cited by examiner

PRODUCTION METHOD FOR A HAIRPIN COIL

CROSS-REFERENCE TO RELATED APPLICATIONS

This application claims priority to and the benefit of German Patent Application No. 102020210575.8, filed on Aug. 20, 2020. The disclosure of the above application is incorporated herein by reference.

FIELD

The present disclosure relates to production method for a hairpin coil.

BACKGROUND

The statements in this section merely provide background information related to the present disclosure and may not constitute prior art.

Electric motors are used in various fields of technology, for example also in automotive engineering. In addition to traditional types of electric motors in which a coil is formed by a wire which is wound around a ferromagnetic core, normally a laminated core, so-called hairpin coils are also known. In the case of hairpin coils, the winding is not carried out by a single wire, but individually prefabricated conductor pieces which resemble hairpins are arranged in a designated configuration on the stator and/or rotor and then electrically connected so that together they form the coil. As a rule, the conductor pieces are made from copper and/or a copper alloy. Generally the ends of the conductor pieces which are provided for the connection are arranged directly adjacent to one another and then connected by laser welding. Various advantages are produced in comparison with the traditional winding of a coil, for example an improved slot-filling ratio, i.e. a better ratio between the assembled cross-sectional surface of the conductors in a slot of the stator and the cross-sectional surface of the slot itself. As a result, the copper consumption may be reduced and motors with higher power and/or a smaller form factor may be produced. A drawback, however, is that the laser welding process involves high costs for the construction of the production plant. Moreover, the reject rate is greater compared to traditionally produced coils.

CN 110417151 A discloses a motor stator and a method for the production thereof. A stator core has a plurality of axially continuous slots following one another in the circumferential direction. A plurality of hairpin-shaped conductors are introduced into the slots, whereby an internal coil unit and an external coil unit are formed. The ends of the conductors are welded together to produce the winding, wherein laser welding, ultrasound welding and friction stir welding are cited are possible welding methods. Details of the welding process are not disclosed.

U.S. Pub. No. 2017/0033629 A1 discloses a C-shaped half-coil for a rotor body of an electric machine, wherein the rotor body comprises axial slots. The C-shaped half-coil comprises an active portion which is provided to be embedded through the respective axial slot and two opposing winding end portions with a curved radius, as well as a winding stack, wherein each winding of the winding stack has two separate, adjacent individual conductors which are connected together. Axial ends of the one conductor are arranged in the vicinity of curved radius portions of the other conductor. Various options are proposed for connecting the conductors, including soldering, friction welding, riveting, screw connecting or crimping.

A short-circuit rotor for an asynchronous machine is disclosed in DE 102 58 029 B4, with a rotor cage made of electrically conductive rotor bars and electrically conductive short circuit rings. The rotor bars are arranged in grooves of a rotor laminated core and the ends of the rotor bars are connected to at least one of the short circuit rings by a friction-welded connection. The ends of the rotor bars to be connected by friction welding to the short circuit ring protrude into a contact coating and a welded connection of the short circuit ring both to the rotor bars and to the contact layer is implemented by the friction welding.

JP 2004-236456 A discloses a method for producing a rotor of an induction motor. In this case the rotor bars of a rotor cage are installed in slots in a rotor core, so that the ends of the rotor bars protrude outwardly from the end surface of the rotor core. An end ring is placed on the end surface of the rotor core and the ends of the rotor bars are fitted into through-holes of the end ring. The projection of a rotary tool is oriented radially inwardly and pressed against the circumferential surface of the end ring. Then the rotary tool is rotated at high speed about its axis of symmetry and the projection is pressed into the circumferential portion of the end ring, whilst the rotary tool is guided in the circumferential direction about the circumferential portion of the end ring.

In view of the prior art set forth, the reliable and efficient production of hairpin coils still leaves further room for improvement.

SUMMARY

This section provides a general summary of the disclosure and is not a comprehensive disclosure of its full scope or all of its features.

The present disclosure provides a reliable and efficient production of a hairpin coil.

It should be mentioned that the features and measures set forth individually in the following description may be combined together in any technically expedient manner and disclose further variations of the disclosure. The description characterizes and specifies the disclosure additionally, in particular, in combination with the figures.

A production method for a hairpin coil is provided in the present disclosure. The term "hairpin coil" relates in this case to a coil, the conductor thereof and/or the winding thereof not consisting of a continuously wound wire but of individual conductor elements which are prefabricated and then electrically connected together, said conductor elements being configured in the manner of a hairpin and in some cases also being denoted as "hairpin conductors" or "hairpin elements". In particular, the hairpin coil may be part of an electric motor. In particular, it may be the coil of a stator or the coil of a rotor of the electric motor. The electric motor may be a traction motor and/or drive motor of an electric vehicle.

According to one step of the method, a plurality of hairpin-like conductor elements are positioned on a coil support such that conductor end portions of conductor elements to be connected, which protrude from the coil support, are arranged adjacent to one another as conductor end portion pairs. The conductor elements are configured in the manner of a hairpin, i.e., the conductor elements have two arms extending in a direction of extension as well as a curved portion connecting the two arms. The arms may be configured at least in some portions in a linear manner and/or run parallel to one another. The curved portion may be configured to be curved and/or angled-back. The respective conductor element generally made from copper and/or a copper alloy and is at least substantially provided with an insulating coating (insulating lacquer or the like). The coil support may be configured in one piece or multiple pieces and generally forms a common base on which the conductor elements may be positioned and, for example, may be received by a positive connection. For example, the coil support may have a ferromagnetic coil core which is typically configured as a laminated core. Optionally the coil support may also be denoted as the coil core or laminated core. However, the term "coil support" is not limited to elements having ferromagnetic properties. It goes without saying that the positioning of the conductor elements on the coil support and/or the insertion of the conductor elements into the coil support normally takes place mechanically and fully automatically. The conductor elements are positioned on the coil support such that conductor end portions protrude from the coil support. The conductor end portions are in this case normally part of the aforementioned arms of the conductor element. Depending on the configuration, the conductor end portions of the different conductor elements may run in groups or parallel to one another in their entirety. Optionally the conductor end portions may also be bent after they have been positioned on the coil support. In this context, this may also be referred to as an interlacing of the conductor end portions. The conductor end portions protrude from the coil support and thus are not and/or only incompletely supported by the coil support. Conductor end portions of conductor elements which are to be (electrically) connected together are arranged adjacent to one another (in pairs) so that in each case these conductor end portions form a conductor end portion pair. Normally each conductor element has two conductor end portions and the number of conductor end portion pairs to be connected corresponds to the number of conductor elements. Depending on the configuration of the coils, however, deviations therefrom are also possible.

In a further step, the relative position of the conductor end portions of a conductor end portion pair is secured. In other words, the conductor end portions of the respective conductor end portion pair are normally secured by a positive connection and optionally by a non-positive connection against a mutual displacement. This may also be referred to as the conductor end portions being blocked against one another. Insofar as the conductor elements and thus also the conductor end portions have a certain flexibility, it is possible that the conductor end portions are not as a whole fully blocked, but only in some regions, whilst in other regions a (slight) displacement is possible relative to one another. The potential issue for the following method step that results from the conductor end portions being supported by the coil support, which is at best incomplete, is reduced or inhibited by the blocking. In addition to securing the relative position of the conductor end portions, the coil support is normally also blocked and thus protected against displacement.

In a further method step, the respective conductor end portions of a plurality of conductor end portion pairs are simultaneously welded by friction welding, by a friction surface of a welding tool being simultaneously moved in a frictional manner along the plurality of conductor end portion pairs. In other words, welding is carried out simultaneously in a plurality of conductor end portion pairs, wherein the conductor end portions of the respective conductor end portion pairs are connected together by the welding. The welding process per se is based on friction welding, wherein by friction, the kinetic energy of a welding tool leads to a heating and optionally an active deformation of the two conductor end portions by which they are connected together. In this case, it is possible that the conductor end portions are heated to a sufficient extent that they melt in a localized area. Generally, however, the conductor end portions are only plasticized, without the melting temperature being reached. In any case, the welding is based on the fact that a friction surface of the welding tool is moved in a frictional manner along the respective conductor end portion pair. It goes without saying that the welding tool in this case is driven by motor. The welding tool and/or the part which forms the friction surface may be made from different materials, for example a metal or ceramics. In order to produce an effective friction, a certain contact pressure also has to be generated between the welding tool with the friction surface and the respective conductor end portion pair. The blocking of the two conductor end portions serves, on the one hand, to achieve that the conductor end portions are located in the correct position relative to one another during the welding process. This blocking may also serve to achieve, on the other hand, that the aforementioned contact pressure is able to be created without the conductor end portions being excessively deflected. According to the disclosure, successive welding of individual conductor end portion pairs does not take place, but a plurality of conductor end portion pairs is welded simultaneously by the friction surface acting simultaneously on these conductor end portion pairs. It has been shown that in this manner a simultaneous, i.e. chronologically parallel, welding may be achieved, which leads to reliable connections of high quality. Accordingly, the reject rate is low in the method according to the disclosure. Due to the welding processes carried out in parallel on a plurality of conductor end portion pairs, the method is time-efficient. In contrast to laser welding, the corresponding production plant may be constructed at relatively low cost.

According to one form of the present disclosure, the relative positions of the conductor end portions are secured by a mask having a plurality of through-openings and being positioned such that in each case a conductor end portion pair is positively received in a through-opening and protrudes therethrough. The mask may be made from, for example, metal or ceramics. The mask may be configured, in particular, as a planar disk. The mask has a plurality of through-openings, wherein one through-opening is provided for each conductor end portion pair. The mask may be configured in one piece. However, it might also be possible, for example, for the mask to be two superimposed disks and/or for two disk-shaped superimposed masks to be used. In order to block the conductor end portions against one another, these conductor end portions are partially passed through the through-openings so that they protrude therethrough. In this case the respective through-opening is dimensioned such that it is able to receive positively the conductor end portion pair. The positive connection may be optionally complemented by a non-positive connection so that the conductor end portion pair is clamped in the through-opening. Apart from the through-openings provided for the conductor end portions, the mask may be inherently closed. In addition to its blocking function, the mask may also potentially serve to collect material which could be released from the conductor end portions during the welding process.

In some circumstances each through-opening could have a cross-section, for example, which is adapted almost exactly to the cross-section of the conductor end portion pair. This form or variation, however, may impede the removal of the mask after the welding process since the cross-section through the conductor end portion pair may be locally increased by the welding. Advantageously, in each case the through-openings have a cross-section which widens in an adjusting direction from a securing region to an insertion region, wherein each conductor end portion pair is guided through the through-opening in the insertion region and the mask is then adjusted relative to the conductor end portion pairs in the adjusting direction, such that each conductor end portion pair passes into the securing region and is positively held therein. In other words, the cross-section tapers and/or narrows from a first region of the through-opening which is denoted as the insertion region to a second region which is denoted as the securing region. In the insertion region the cross-section is dimensioned such that the conductor end portion pair may be inserted easily and with a spacing from the edges of the through-opening. Then the mask is adjusted in the adjusting direction relative to the conductor end portion pair, whereby the conductor end portion pair passes from the insertion region into the securing region. The cross-section of the securing region is dimensioned in this case such that the conductor end portion pair is positively received therein. In particular, the cross-section may be such that the conductor end portion pair is clamped, and thus the positive connection is complemented by a non-positive connection. In this context it is also advantageous if the coil support has been previously blocked so that the conductor end portions are not able to deflect and/or are able to deflect less, when and/or if they are subjected to a force when clamped inside the through-opening.

In some configurations it might be conceivable that the adjusting direction is identical for all of the through-openings so that the mask may be adjusted by a translational displacement. Alternatively, the adjusting direction may correspond to a tangential direction relative to an adjusting axis of the mask and the mask may be adjusted by rotating about the adjusting axis. The adjusting axis may in this case also be an axis of symmetry of the mask, the mask being configured rotationally symmetrically relative thereto. In any case the adjustment takes place by a rotation about the adjusting axis, wherein all parts of the mask including the through-openings move tangentially. Correspondingly, the through-openings are configured such that the adjusting direction, in which the cross-section widens, corresponds to a tangential direction. The insertion of the conductor end portion pairs in the through-openings may take place, in particular, in the axial direction, i.e. parallel to the adjusting axis. As already indicated above, the mask could also be two superimposed parts (for example disks) and/or two superimposed masks could be used. In this case, the conductor end portion pairs could be secured by both masks being rotated in opposing directions to one another. The through-openings of the one mask could in this case be configured mirror-symmetrically to those of the other mask, i.e. the sequence of the insertion region and securing region in the one mask might oppose that of the other mask.

After all of the conductor end portion pairs have been welded, the mask may be removed again. Provided it is configured as a planar disk, the mask may normally be lifted away perpendicular to its extension plane. In some circumstances, it may be possible to remove the conductor end portion pairs in a simple manner from the securing regions. This may be difficult or impossible, however, in particular when the conductor end portion pairs are clamped in the securing region. According to another form, the conductor end portion pairs are released after the welding process, by the mask being adjusted counter to the adjusting direction before it is removed. By the adjustment counter to the adjusting direction, the conductor end portion pairs pass from the securing region back into the insertion region through which they are able to pass in a simple manner when the mask is removed.

In some variations, the mask is removed after the welding process and reused. The mask may be used consecutively for producing a plurality of hairpin coils. This is possible primarily because the mask itself is normally not subjected to any appreciable mechanical or thermal load. The reusability may naturally also be assisted by hard-wearing materials, such as for example stainless steel or ceramics, being used for producing the mask.

As has already been described above, a particular advantage of the method is that a plurality of conductor end portion pairs may be welded chronologically in parallel. In particular, in the method it is possible for the welding tool to act simultaneously on all of the conductor end portion pairs and to weld the respective conductor end portions thereof. In this manner, a maximum efficiency is achieved in terms of time. It has been shown that it is possible to weld all of the conductor end portion pairs simultaneously with a single welding tool, whilst ensuring reliable welding connections.

Various options are conceivable regarding the movement of the welding tool. Thus the welding tool could perform, for example, a linear, oscillating movement. According to a further form, the welding tool rotates about a rotational axis during the welding process. The rotational axis in this case is normally an axis of symmetry of the welding tool. The rotational axis may also run parallel to an axis of symmetry of the coil support and/or coincide therewith. In particular, when the conductor end portion pairs are arranged rotationally symmetrically about the axis of symmetry of the coil support (which is generally the case) it is advantageous if the rotational axis corresponds to the axis of symmetry of the coil support.

Also in the case of a rotating welding tool, various options are provided regarding the geometry of the friction surface. For example, this friction surface could be configured in a frustoconical shape. Advantageously, the friction surface may be configured to be planar and run perpendicular to the rotational axis. The friction surface in this case may have the shape of a circular disk and/or a circular ring. For the simultaneous welding of all of the conductor end portion pairs, the rotating circular disk may be moved relative to the conductor end portion pairs, which in turn are arranged about the axis of symmetry of the coil support, in a centered manner toward said axis of symmetry. If the friction surface and the shape thereof are discussed here and hereinafter, this refers to the general shape overall and not to the fine structure. The fine structure may be complex since the friction surface may have a certain degree of roughness which is systematically set and by which the friction is increased. Thus, for example, a "planar" circular disk in this sense may have a roughened surface similar to sandpaper or a surface which has regular structures, such as for example spiral-shaped, radial and/or tangential grooves or raised portions.

The operating parameters of the welding tool which are desired and/or optimal for the welding process depend on different factors, for example on the material of the conductor end portions (for example the copper alloy used), on the cross-sectional geometry of the conductor end portions, on the number of conductor end portion pairs to be welded, on the spacing of the respective conductor end portion pair from the rotational axis of the welding tool, on the material of the welding tool and/or the friction surface and the geometry thereof, etc. In many cases it has been shown to be expedient if the welding tool exerts a pressure of 50-80 MPa on the conductor end portion pairs, acts for 8-15 s thereon and is operated at 150-500 R/min. The optimal parameters may be determined in an individual case by a series of tests.

Potentially it may be desired that a deburring of the conductor end portion pairs is carried out after the welding process. The deburring may be carried out, for example, before the mask is removed, whereby parts of the coil located below the mask may be protected. In some circumstances, it might also be conceivable that the deburring is carried out entirely or partially when removing the mask, by burrs being sheared off to a certain extent when the conductor end portion pairs are passed through the through-openings. Often, however, the welding is carried out without burring, i.e. without the formation of burrs which would have to be retrospectively removed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In the various figures, the same parts are always provided with the same reference numerals which is why generally these parts are only described once.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
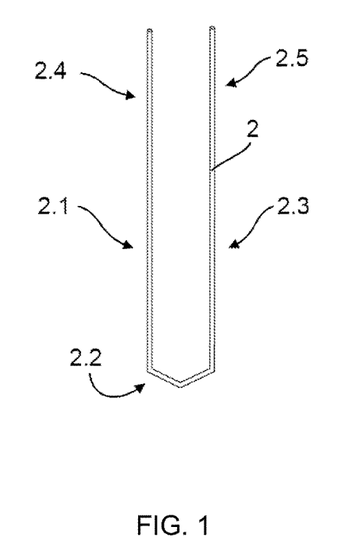
FIG. 1 shows a conductor element for use in a production method according to the present disclosure.
Figure 2A:
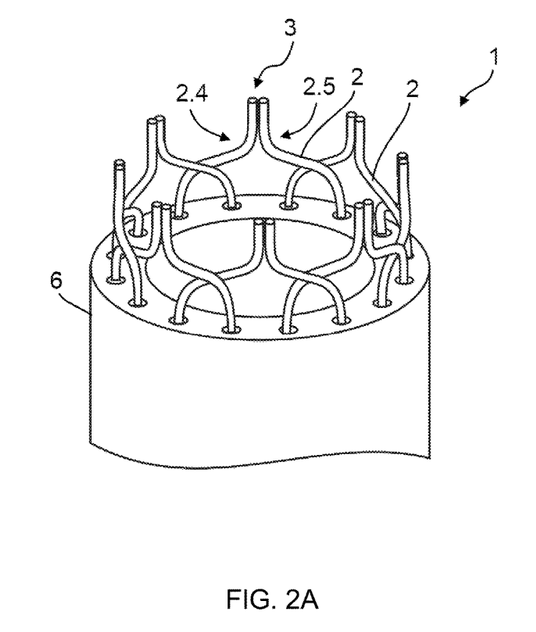
FIG. 2A shows part of a hairpin coil during a step of a production method according to the present disclosure.

FIG. 1 shows a conductor element 2 which may be used for producing a hairpin coil 1 (FIG. 2A). The conductor element 2, which may also be denoted as a hairpin element 2, is configured in the manner of a hairpin and has two arms 2.1, 2.3 which are connected by a curved portion 2.2. The conductor element is produced in one piece from copper and/or a copper alloy and has an electrically insulating surface coating. Two conductor end portions 2.4, 2.5 are configured on the end side of the arms 2.1, 2.3.

FIG. 2A illustrates a first step during a production method according to the disclosure of the hairpin coil 1 which, for example, may be part of a stator for a drive motor of an electric vehicle. All of the views of the hairpin coil 1 and the further elements shown are to be understood schematically and may deviate in terms of details from the actual circumstances. A plurality of hairpin elements 2 has been inserted into a coil support 6 and the conductor end portions 2.4, 2.5 have been bent back such that they form a plurality of conductor end portion pairs 3, if an electrical connection is provided. In this method step, however, the conductor end portions 2.4, 2.5 which belong to one another and which are to be connected are arranged only adjacently to one another, without an electrical connection being provided.

Figure 2B:
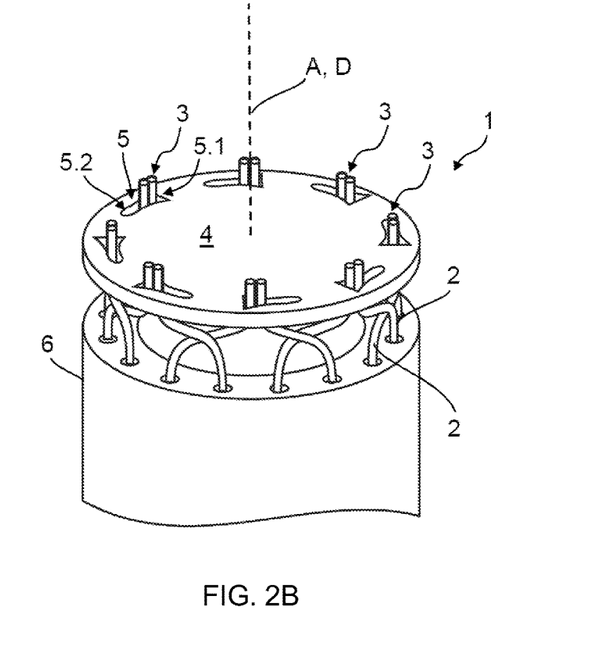
FIG. 2B shows part of the coil during another step of the production method according to the present disclosure.
Figure 3:
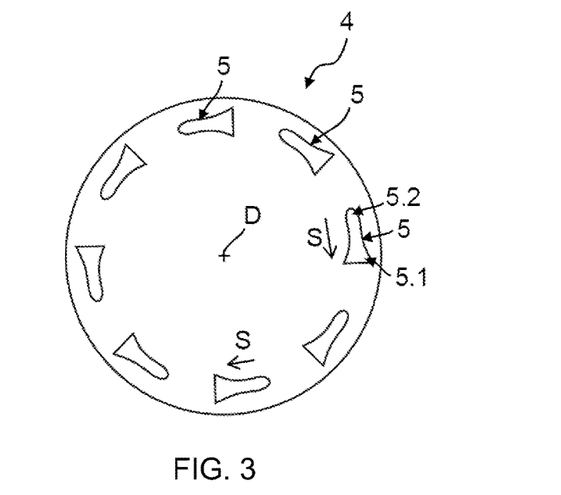
FIG. 3 shows a mask for use in the production method according to the present disclosure.

In a further method step, a mask 4 made of metal (for example stainless steel) or ceramics is placed on the conductor end portion pairs 3 as shown in FIG. 2B. The mask 4 is shown individually in FIG. 3 in plan view. In some variations, the mask 4 is configured as a planar circular disk and has a plurality of through-openings 5 which are arranged in an equidistant manner about an adjusting axis D of the mask 4. The adjusting axis D also corresponds to the central point of the mask 4. Each through-opening 5 is configured so as to be extended in the tangential direction. The cross-section of the through-opening 5 widens in an adjusting direction S which corresponds to the tangential direction relative to the adjusting axis D, from a securing region 5.2 to an insertion region 5.1. When positioned on the conductor end portion pairs 3, the mask 4 is moved approximately or exactly parallel to an axial direction A which corresponds to the axis of symmetry of the coil support 6. In this case, the insertion regions 5.1 of the through-openings 5 are oriented toward the conductor end portion pairs 3, so that the conductor end portion pairs pass through the through-openings. The cross-section of the respective through-opening 5 in the insertion region 5.1 is sufficiently large for the conductor end portion pair 3 to be able to be easily passed through without contact. The coil support 6 is normally clamped before positioning the mask 4 in order to inhibit positional changes.

Figure 2C:
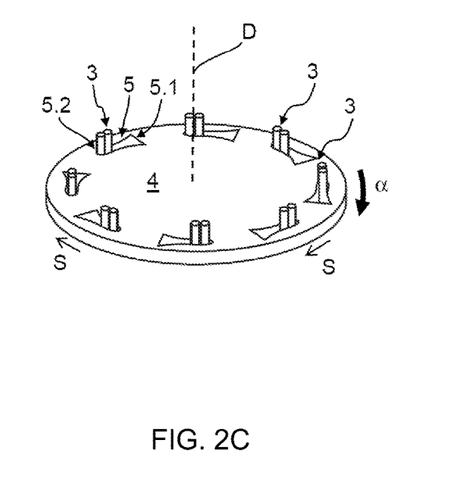
FIG. 2C shows part of the coil during another step of the production method according to the present disclosure.

In a further method step which is shown in FIG. 2C, relative positional changes of the conductor end portions 2.4, 2.5 of one respective conductor end portion pair 3 are inhibited by the mask 4 being adjusted in the adjusting direction S, which corresponds to a rotation about the center of rotation R (FIG. 2D) by an adjusting angle α of a few degrees. As a result, each conductor end portion pair 3 passes from the insertion region 5.1 into the securing region 5.2, where it is positively and normally also non-positively received, i.e. in particular may be clamped. In this case it is provided that the two conductor end portions 2.4, 2.5 are in contact on one side, wherein the free ends thereof can be arranged flush with one another, and wherein naturally a predefined height offset may be present, which however is not additionally detrimental. In FIGS. 2C-2F, the coil support 6 and the conductor end portions 2.4, 2.5 below the mask 4 are omitted for reasons of clarity.

Figure 2D:
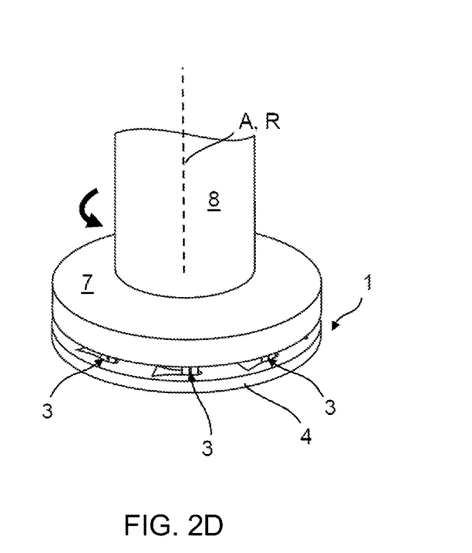
FIG. 2D shows part of the coil during another step of the production method according to the present disclosure.
Figure 4:
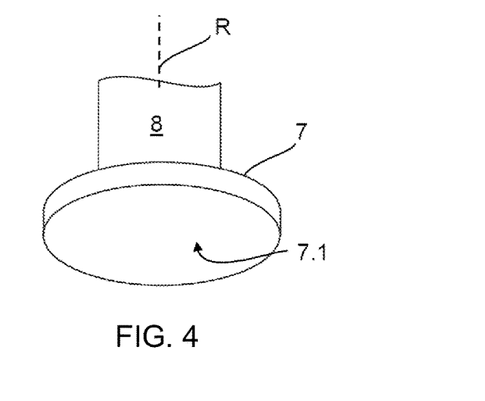
FIG. 4 shows a welding tool for use in the production method according to the present disclosure.

After the relative positions inside each conductor end portion pair 3 have been secured as described, a welding disk 7 (also referred to herein as a "welding tool") serving as a welding tool is guided in the axial direction A onto the conductor end portion pairs 3 and set in rotation as shown in FIG. 2D. The welding disk may be operated, for example, at a rotational speed of 150-500 revolutions per minute (RPM). In some variations, the welding disk 7 which is shown individually in FIG. 4, is fastened to a motor-driven shaft 8 and has a planar circular friction surface 7.1 which runs perpendicular to the rotational axis R of the welding disk 7. The roughness of the friction surface 7.1 may be set systematically such that a designated level of friction between the friction surface 7.1 and the conductor end portion pairs 3 is achieved when, during the rotation of the welding disk 7, the friction surface 7.1 is guided along or across the conductor end portion pairs 3. The friction surface 7.1 in this case is shown as simply circular and smooth but it may also have a structure by which the roughness is increased, and thus the friction between said friction surface and the conductor end portion pairs 3 is intensified. For example, said friction surface may have spiral-shaped, radial and/or tangential grooves and/or raised portions, or it may be designed to a certain extent as randomly textured—similar to sandpaper. Whilst the friction surface 7.1 acts on the conductor end portion pairs 3, the welding tool 7 may exert a pressure of 50-80 MPa, for example, on the conductor end portion pairs 3. A heating and a reshaping of the conductor end portions pairs 3 is carried out by the resulting friction, wherein the material thereof is at least plasticized. This leads, therefore, to a welding of the conductor end portions 2.4, 2.5 of the respective conductor end portion pair 3. The friction surface 7.1 in this case acts simultaneously on all of the conductor end portion pairs 3 and welds them by friction welding. The length of time for acting on the friction surface 7.1 may range from 8-15 s, for example.

Figure 2E:
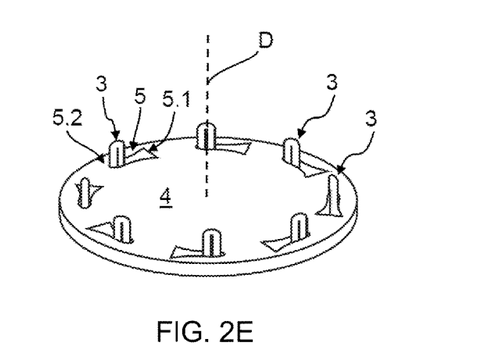
FIG. 2E shows part of the coil during another step of the production method according to the present disclosure.

When this is concluded, as shown in FIG. 2E, the welding disk 7 is removed. Optionally a deburring may be carried out before the mask 4 is also removed.

Figure 2F:
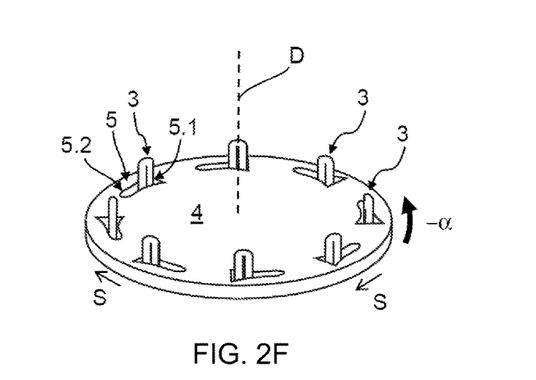
FIG. 2F shows part of the coil during another step of the production method according to the present disclosure.

In order to facilitate the lifting away of the mask 4, as indicated in FIG. 2F, said mask is rotated counter to the adjusting direction S by the negative adjusting angle—α about the center of rotation R (FIG. 2D), whereby the conductor end portion pairs 3 in turn pass into the insertion regions 5.1 and the aforementioned positive connection and non-positive connection are released.

Figure 2G:
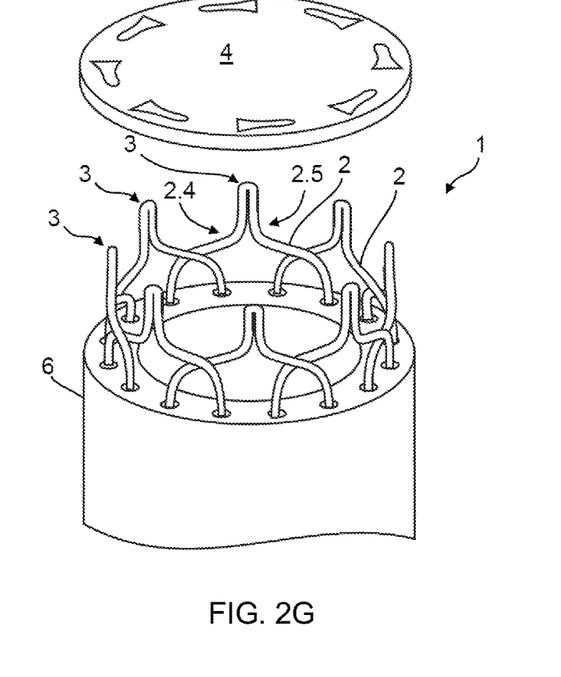
FIG. 2G shows part of the coil during another step of the production method according to the present disclosure.

Subsequently, the mask 4 may be lifted away in a simple manner as indicated in FIG. 2G, wherein the conductor end portion pairs 3 pass through the insertion regions 5.1.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A production method for manufacturing a hairpin coil, the production method comprising:
    positioning a plurality of hairpin elements on a coil support such that conductor end portions of the plurality of hairpin elements to be connected protrude from the coil support and are arranged adjacent to one another as conductor end portion pairs, the conductor end portions of each of the conductor end portion pairs are aligned with each other one after the other in a circumferential direction about a center axis of a mask at a same radial distance from the center axis,
    securing a relative position of the conductor end portions of each of the conductor end portion pairs, and
    welding the respective conductor end portions of the conductor end portion pairs by friction welding with a friction surface of a welding tool moving in a frictional manner along the conductor end portion pairs, the relative position of the conductor end portions of each of the conductor end portion pairs being further secured during friction welding,
    wherein the welding tool acts simultaneously on and friction welds the conductor end portions of all of the conductor end portion pairs.

2. The production method according to claim 1, wherein the relative positions of the conductor end portions are secured by the mask having a plurality of through-openings and being positioned such that each of the conductor end portion pairs is positively received in and protrudes through a respective through-opening of the mask.

3. The production method according to claim 2, wherein:
    each of the plurality of through-openings have a cross-section that widens in a first circumferential direction from a securing region to an insertion region, and
    positioning the plurality of hairpin elements further includes
        guiding each of the conductor end portion pairs through a respective through-opening in the insertion region, and
        adjusting the mask relative to the conductor end portion pairs in the first circumferential direction such that each of the conductor end portion pairs passes into and is positively held in the securing region of a respective through-opening.

4. The production method according to claim 3, wherein the first circumferential direction corresponds to a tangential direction relative to a rotational axis, and wherein the rotational axis is a rotational axis of the mask and the mask is adjusted by rotating about the rotational axis.

5. The production method according to claim 4, further comprises releasing the conductor end portion pairs after the welding by rotating the mask counter to the first circumferential direction before the mask is removed.

6. The production method according to claim 5, wherein the mask is removed after the welding and reused.

7. The production method according to claim 1, wherein the welding tool rotates about a rotational axis during the welding.

8. The production method according to claim 7, wherein the friction surface is planar and runs perpendicular to the rotational axis.

9. The production method according to claim 1 further comprising deburring the conductor end portion pairs after the welding of the respective conductor end portions.

10. A production method for manufacturing a hairpin coil, the production method comprising:
positioning a plurality of hairpin elements in a coil support such that conductor end portions of the plurality of hairpin elements to be connected protrude from the coil support a predefined height and are arranged adjacent to one another as conductor end portion pairs, the conductor end portions of each of the conductor end portion pairs are aligned with each other one after the other in a circumferential direction about a center axis of a mask at a same radial distance from the center axis,
placing the mask with a plurality of through-openings on the conductor end portion pairs such that each of the conductor end portion pairs is positively received in and protrudes through a respective through-opening of the mask,
rotating the mask such that a relative position of each the conductor end portions of each of the conductor end portion pairs is secured, and
simultaneously friction welding the respective conductor end portions of the conductor end portion pairs with a friction surface of a welding tool moving in a frictional manner along the plurality of conductor end portion pairs, the relative position of the conductor end portions of each of the conductor end portion pairs being further secured during friction welding.

11. The production method according to claim 10, wherein each of the plurality of through-openings have a cross-section that widens in a first circumferential direction from a securing region to an insertion region, each of the conductor end portion pairs is guided through a respective through-opening in the insertion region, and the mask is adjusted such that each of the conductor end portion pairs passes into and is positively held in the securing region of the respective through-opening.

12. The production method according to claim 11, wherein the first circumferential direction corresponds to a tangential direction relative to a rotational axis of the mask and the mask is adjusted by rotating about the rotating axis.

13. The production method according to claim 12, wherein the conductor end portion pairs are released after the friction welding by adjusting the mask in a second circumferential direction counter to the first circumferential direction.

14. The production method according to claim 13 further comprising removing the mask after friction welding the conductor end portions of the conductor end portion pairs.

15. The production method according to claim 10, wherein the welding tool simultaneously friction welds the conductor end portions of all of the conductor end portion pairs.

16. The production method according to claim 15 further comprising deburring the conductor end portion pairs after friction welding the conductor end portions.

17. A production method for manufacturing a hairpin coil, the production method comprising:
positioning a plurality of hairpin elements in a coil support such that conductor end portions of the plurality of hairpin elements protrude from the coil support and are arranged adjacent to one another as conductor end portion pairs, wherein the conductor end portions protrude a predefined height from the coil support,
placing only one mask with a plurality of through-openings on the conductor end portion pairs such that each of the conductor end portion pairs is positively received in and protrudes through a respective through-opening of the mask,
rotating the only one mask between a first position in which each of the conductor end portions of each of the conductor end portion pairs are spaced apart from the only one mask and a second position in which a relative position of each of the conductor end portions of each of the conductor end portion pairs is secured, and
simultaneously friction welding the respective conductor end portions of the conductor end portion pairs with a friction surface of a welding tool moving in a frictional manner along the plurality of conductor end portion pairs.

18. The production method according to claim 17, wherein each of the plurality of through-openings have a cross-section that widens in an adjusting direction from a securing region to an insertion region, each of the conductor end portion pairs is guided through a respective through-opening in the insertion region, and the only one mask is adjusted relative to the conductor end portion pairs in the adjusting direction such that each of the conductor end portion pairs passes into and is positively held in the securing region of a respective through-opening.

19. The production method according to claim 18, wherein the adjusting direction corresponds to a tangential direction relative to a rotational axis of the only one mask and the only one mask is adjusted by rotating about the rotational axis and the conductor end portion pairs are released after the friction welding by rotating the only mask in a direction counter to the adjusting direction.

* * * * *